United States Patent [19]

Opitz et al.

[11] Patent Number: 5,028,342
[45] Date of Patent: Jul. 2, 1991

[54] DRILLING MUD ADDITIVES BASED ON A POLYMER MIXTURE, THEIR USE, AND A PROCESS FOR THEIR PRODUCTION

[75] Inventors: Willy Opitz, Siegburg Fel.; Heinz Mueller, Monheim; Claus-Peter Herold, Mettmann; Stephan Von Tapavicza, Erkrath, all of Fed. Rep. of Germany

[73] Assignees: Henkel Kommanditgesellschaft auf Aktien, Duesseldorf; Phrikolat Chemische Erzeugnisse GmbH, Siegburg, both of Fed. Rep. of Germany

[21] Appl. No.: 414,978

[22] Filed: Sep. 29, 1989

[30] Foreign Application Priority Data

Sep. 29, 1988 [DE] Fed. Rep. of Germany ....... 3833045

[51] Int. Cl.$^5$ .......................... E21B 43/22; C09K 7/02
[52] U.S. Cl. .................. 252/8.513; 252/8.51; 252/8.511; 252/8.512; 252/8.551; 523/130
[58] Field of Search ............... 252/8.512, 8.511, 8.513, 252/8.51, 8.551; 523/130

[56] References Cited

U.S. PATENT DOCUMENTS

| | | | |
|---|---|---|---|
| 2,873,251 | 2/1959 | Jones | 252/8.51 |
| 3,764,530 | 10/1973 | Burland et al. | 252/8.51 |
| 4,043,921 | 8/1977 | Hessert et al. | 252/8.51 |
| 4,046,197 | 9/1977 | Gruesbeck, Jr. et al. | 166/305 R |
| 4,299,710 | 11/1981 | Dupre et al. | 252/8.511 |
| 4,301,016 | 11/1981 | Carriere et al. | 252/8.51 |
| 4,330,441 | 5/1982 | Bohmer et al. | 525/54.23 |
| 4,536,296 | 8/1985 | Vio | 252/8.511 X |
| 4,554,307 | 11/1985 | Farrar et al. | 524/425 |
| 4,600,515 | 7/1986 | Gleason et al. | 252/8.511 |
| 4,604,217 | 8/1986 | Lukach et al. | 252/8.551 |
| 4,607,066 | 8/1986 | Barry et al. | 523/130 |
| 4,617,132 | 10/1986 | Dairymple et al. | 252/8.554 |
| 4,631,137 | 12/1986 | Dymond | 252/8.514 |
| 4,647,384 | 3/1987 | Bardoliwalla et al. | 252/8.51 |
| 4,664,818 | 5/1987 | Halliday et al. | 252/8.511 |
| 4,674,574 | 6/1987 | Savoly | 166/293 |
| 4,680,128 | 7/1987 | Portnoy | 252/8.511 |
| 4,703,801 | 11/1987 | Fry et al. | 166/293 |
| 4,738,788 | 4/1988 | Aurenge | 252/8.514 |
| 4,749,498 | 6/1988 | Lange et al. | 252/8.514 |
| 4,836,940 | 1/1989 | Alexander | 252/8.512 |
| 4,888,120 | 12/1989 | Mueller et al. | 252/8.551 |
| 4,915,174 | 4/1990 | Berrod | 166/305.1 |
| 4,946,605 | 8/1990 | Farrar et al. | 252/8.514 |

FOREIGN PATENT DOCUMENTS 0122073 10/1984 European Pat. Off. .
0131124 1/1985 European Pat. Off. .

OTHER PUBLICATIONS

Chemical Abstract, vol. 100 (1984), Abst. No. 212787V,
Chemical Abstract, vol. 100 (1984), Abst. No. 212788W.

*Primary Examiner*—Robert L. Stoll
*Assistant Examiner*—Chhaya Sayala
*Attorney, Agent, or Firm*—Ernest G. Szoke; Wayne C. Jaeschke; Henry E. Millson, Jr.

[57] ABSTRACT

Drilling mud additives based on a polymer mixture of 20 to 80% by weight carboxymethyl cellulose and 80 to 20% by weight of a polycarboxylic acid selected from polyacrylate, polymethacrylate and/or copolymers thereof and/or salts thereof, in which the carboxymethyl cellulose, which has been obtained from raw linters and/or wood cellulose by the slurry process, is mixed in wet, alcohol-moist form with the polycarboxylic acid and dried, to their use in drilling muds or workover and packer liquids, and to a process for their production.

23 Claims, No Drawings

DRILLING MUD ADDITIVES BASED ON A POLYMER MIXTURE, THEIR USE, AND A PROCESS FOR THEIR PRODUCTION

BACKGROUND OF THE INVENTION

1. Field of the Invention

This invention relates to drilling mud additives based on a polymer mixture, to the use of the drilling mud additives, and to a process for their production.

2. Statement of Related Art

To obtain optimal results when drilling for oil or natural gas, the drilling mud has to be adapted to the particular layers of rock through which the drill passes. In the case of water-based drilling muds, rheology is adjusted and the losses of water under pressure are reduced by the use of bentonite or other clays, such as attapulgite for example, and water-soluble polymers, such as for example starch, carboxymethyl cellulose (CMC), hydroxyethyl cellulose (HEC), carboxymethyl hydroxyethyl cellulose (CMHEC), as protective colloids.

Since at present increasingly deeper pools and more difficult formations are having to be developed, the drilling mud also has to meet increasingly more stringent requirements, particularly with respect to temperature stability and electrolyte compatibility. These stringent requirements cannot be satisfied by the water-soluble polymers mentioned above, such as starch, CMC, HEC or CMHEC, because at temperatures above 120° to 150° C. they generally undergo such rapid thermal degradation that their economical use is no longer possible.

It is also known from the prior art that mixtures of water-soluble polymers based on polysaccharides, for example CMC, HEC, CMHEC or starch, and synthetic polycarboxylic acids can be used in drilling muds. Although the rheological properties and other properties of drilling muds can be better adapted to practical requirements by combinations such as these, their temperature stability cannot be positively influenced by such additives.

The publications cited below represent a synopsis of the relevant prior art.

Published German application 26 22 409 describes drilling fluids consisting of water-soluble alkenyl acid polymers, for example ethyl acrylate/methyl acrylate acid copolymer, and water-soluble polysaccharide derivatives, for example a hydroxyethyl cellulose.

U.S. Pat. No. 4,425,241 describes drilling fluids containing (a) an aqueous mineral salt solution,
(b) clay minerals forming a filter cake at the wall of the borehole,
(c) a polyethylene glycol and
(d) at least one water-dispersible thickener, for example carboxyalkyl hydroxyalkyl cellulose;

The above drilling fluid has improved liquid loss properties.

Chemical Abstracts, Vol. 100 (1984), Abstract No. 212787v, describes drilling fluids containing a bentonite, optionally a thickener, such as carboxymethyl cellulose, and a polyacrylate having a calcium complexing power of more than 300 mg/g, such as sodium polyacrylate.

Chemical Abstracts, Vol. 100 (1984), Abstract No. 212788w, describes drilling fluids containing a bentonite, optionally a thickener, such as carboxymethyl cellulose, and a polyacrylate having a calcium complexing power of more than 300 mg/g for preventing gel formation in the presence of salts and cement.

Newly developed synthetic polymers, as described for example in published German application 31 44 770, and 34 04 491, and published European application 0 122 073 and 0 131 124, can be used at temperatures of up to about 200° C., but are considerably more expensive than the conventional polysaccharide-based polymers due to the high cost of the special polymers used. Accordingly, the economy of the drilling process is greatly reduced where these polymers are used.

DESCRIPTION OF THE INVENTION

Other than in the operating examples, or where otherwise indicated, all numbers expressing quantities of ingredients or reaction conditions used herein are to be understood as modified in all instances by the term "about".

The problem addressed by the present invention is to provide a new drilling mud additive based on a polymer mixture which shows higher temperature and electrolyte stability by comparison with drilling mud additives known from the prior art and which, in addition, is less expensive than the synthetic drilling mud additives described above.

This problem is solved by a combination—prepared under special conditions—of the cellulose ether, carboxymethyl cellulose, and certain polycarboxylic acids.

Accordingly, the present invention relates to drilling mud additives based on a polymer mixture of 20 to 80% by weight carboxymethyl cellulose and 80 to 20% by weight of at least one polycarboxylic acid selected from a homopolymer of acrylic acid, a homopolymer of methacrylic acid, and/or a copolymer of acrylic acid and methacrylic acid and/or salts thereof, in which technical or purified carboxymethyl cellulose, which has been obtained from raw linters and/or wood cellulose by the slurry process, is mixed in wet, alcohol-moist form with the polycarboxylic acid and dried.

These additives show very good temperature stability and high electrolyte compatibility compared with additives known from the prior art and, in addition, are less expensive to produce than synthetic polymers.

The drilling mud additives of the invention preferably consist of 30 to 70% by weight and more preferably 40 to 60% by weight carboxymethyl cellulose and of 70 to 30% by weight and more preferably 60 to 40% by weight polycarboxylic acids.

The carboxymethyl cellulose used for the drilling mud additives according to the invention is preferably prepared from cotton linters by the slurry process using equivalent quantities of sodium hydroxide and monochloroacetic acid. The etherification reaction takes place in the presence of a water-miscible, inert solvent, for example an alcohol, such as ethanol, as suspending agent. The so-called slurry process is known to those skilled in this art, and is described, for example, in "Ullmann's Encyklopädie der technischen Chemie", 4th Edition (1975), Vol. 9, pages 203–204. The carboxymethyl cellulose thus prepared can be used both in the form of the technical, unpurified product and also in purified form. The average degree of substitution (DS) is preferably between 0.9 and 1.5 and more preferably between 1.0 and 1.23. The viscosity, as measured with a Brookfield RVT in a concentration of 5%, is preferably in the range of from 5,000 to 25,000 mPa.s and more preferably in the range of from 10,000 to 20,000 mPa.s.

Numerous polycarboxylic acids and their salts have been described in the prior art. Homopolymers of acrylic acid, homopolymers of methacrylic acid, and/or copolymers of acrylic acid and methacrylic acid and/or soluble salts thereof having number average molecular weights not exceeding 3,000 and preferably in the range from 1,000 to 3,000 are suitable for use in the drilling mud additives according to the invention.

The copolymers referred to above are copolymers of acrylic acid or methacrylic acid with a minor amount, e.g. from 1 to 45%, of at least one addition polymerizable ethylenically unsaturated monomer. Specific examples of such monomers include esters of acrylic acid, methacrylic acid, itaconic acid, maleic acid, and fumaric acid with alkanols having 1 to 20 carbon atoms, such as methanol, ethanol, butanol, 2-ethylhexanol, pentadecanol and the like, methyl Cellosolve and Cellosolve acrylates and methacrylates, acrolein, methacrolein, acrylonitrile, methacrylonitrile, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate, vinyl propionate, β-hydroxyethyl acrylate and methacrylate, β-hdyroxypropyl acrylate and methacrylate, N-hydroxyethylacrylamide, N-methylolacrylamide, and N-methylolmethacrylamide, acrylamide, and methacrylamide.

The soluble salts referred to above include the ammonium and alkali metal salts, e.g., the sodium and potassium salts.

In the production of the drilling mud additives according to the invention, the alcohol-moist CMC which has an ethanol content of preferably about 75% by weight is kneaded with aqueous polycarboxylic acid in an extruder or similar machine and at the same time dried.

Accordingly, the present invention also relates to the production of the drilling mud additives in which 20 to 80% by weight carboxymethyl cellulose obtained from crude linters and/or wood cellulose by the slurry process is mixed in wet alcohol-moist form with 80 to 20% by weight of a polycarboxylic acid selected from a homopolymer of acrylic acid, a homopolymer of methacrylic acid, and/or a copolymer of acrylic acid and methacrylic acid and dried, technical and/or purified carboxymethyl cellulose being used. The preferred ranges mentioned above, which relate to the carboxymethyl cellulose and to the polycarboxylic acids, apply in the same way to the process according to the invention for the production of the drilling mud additives.

The drilling mud additives produced in accordance with the invention show distinctly better properties than those produced by dry mixing of the components.

A typical process for the production of a drilling mud additive according to the invention based on a polymer mixture is described in Example 1.

The high electrolyte compatibility of the drilling mud additive produced in accordance with Example 1 is shown in Example 2 by comparison with pure CMC as known from the prior art.

Typical drilling muds containing the additive according to the invention based on a polymer mixture, a conventional CMC and a polymer mixture which has not been produced in accordance with the invention are compared with respect to their rheological data and the losses of water under pressure in Example 3 and Comparison Examples 1 and 2.

The measurements were carried out with a Fann viscosimeter and with an API filter press as described in "API Standard Procedure for Testing Drilling Fluids, RP 13B".

Where CMC is used, the drastic reduction in viscosity, yield and gel strength after 20 h at 175° C. in a so-called roller oven can clearly be seen; where the drilling mud additive according to the invention based on a polymer mixture is used, the corresponding reductions stay within economically very acceptable limits. Where CMC is used, the loss of water under pressure is also more than twice as high compared with the drilling mud additive according to the invention.

However, in addition to the electrolyte used in a drilling mud, other influxes of caustic liquids can occur during drilling in difficult formations. It is known to those skilled in this art that magnesium salt influxes have a particularly adverse effect on the drilling mud. In Example 4, therefore, a drilling mud containing the drilling mud additive according to the invention based on a polymer mixture was prepared in an Mg mixed liquor. The drilling mud additive showed excellent electrolyte stability in this case, too.

The drilling mud additives according to the invention based on a polymer mixture are generally added to the drilling mud or other well servicing fluids in concentrations of from 0.5 to 5% by weight. In addition to the additional drilling mud additives used in the Examples, other additives may of course also be used. Thus, instead of barite, chalk, iron oxides or other weighting materials may be used to increase density. Instead of NaCl as electrolyte, other salts, such as for example KCl or others known from the prior art, may also be used according to the particular geological requirements. Other additives may also be used in combination with the polymer mixture. The drilling mud additive according to the invention based on a polymer mixture may be used not only in drilling muds, but also in other well servicing fluids where high temperature stability and electrolyte stability are required, for example in workover and packer liquids, or for the cementing in of casings.

The invention is illustrated but not limited by the following Examples.

EXAMPLES

Example 1

10 kg of a still moist, technical CMC produced from raw cotton linters by the slurry process with an active content of 65%, a DS of 1.30 and a viscosity, as measured with a Brookfield RVT on a 5% solution, of 20,000 mPa.s, were intensively mixed with 10 kg of a solution of the sodium salt of a homopolymer of acrylic acid (Mw 2500) for 1 h in a kneader, dried and then ground.

The polymer mixture according to the invention had a Brookfield RVT viscosity of 7,000 mPa.s in the form of a 5% aqueous solution.

Example 2

The polymer mixture of Example 1 according to the invention was compared with CMC with respect to viscosity behavior in various aqueous salt solutions. The viscosity measurements were carried out with a Brookfield RVT.

| Polymer | Salt solution | Residual viscosity in % of the initial value in water |
|---|---|---|
| 5% CMC | Saturated NaCl | 25 |
| 5% Polymer mixture | Saturated NaCl | 35 |
| 5% CMC | Saturated KCl | 1 |
| 5% Polymer mixture | Saturated KCl | 9 |
| 5% CMC | 15% CaCl$_2$ | 0.1 |
| 5% Polymer mixture | 15% CaCl$_2$ | 0.3 |

Example 3

An aqueous NaCl mud containing the drilling mud additive according to the invention based on the polymer mixture of Example 1 was prepared in known manner.

| Mud formulation: | |
|---|---|
| 350 ml | aqueous NaCl solution, saturated |
| 10 g | attapulgite (clay) |
| 12.5 g | polymer mixture of Example 1 |
| 6 ml | diethanolamine |
| 200 g | barite (barium sulfate). |

The following data were measured for this mud at room temperature (Fann viscosimeter):

| | |
|---|---|
| 600 rpm | 116 scale units |
| 300 rpm | 78 scale units |
| apparent viscosity | 58 mPa.s |
| plastic viscosity | 38 mPa.s |
| yield | 19.1 Pa |
| 10 sec. gel strength | 1.4 Pa |
| 10 min. gel strength | 5.7 Pa. |
| After ageing for 20 h at 175° C. in a roller oven, the following values were determined: | |
| 600 rpm | 80 scale units |
| 300 rpm | 46 scale units |
| apparent viscosity | 40 mPa.s |
| plastic viscosity | 34 mPa.s |
| yield | 5.7 Pa |
| 10 sec. gel strength | 1.0 Pa |
| 10 min. gel strength | 1.9 Pa. |

A pressure water loss of 4.1 ml was determined with an API filter press.

Comparison Example 1

The same drilling mud as in Example 3 was prepared with a technical CMC (Brookfield RVT viscosity of a 5% solution 20,000 mPa.s) and measured in the same way.

| Mud formulation: | |
|---|---|
| 350 ml | aqueous NaCl solution, saturated |
| 10 g | attapulgite (clay) |
| 12.5 g | CMC |
| 6 ml | diethanolamine |
| 200 g | barite (barium sulfate). |

Rheological values before ageing (Fann viscosimeter):

| | |
|---|---|
| 600 rpm | 286 scale units |
| 300 rpm | 192 scale units |
| apparent viscosity | 143 mPa.s |
| plastic viscosity | 94 mPa.s |
| yield | 14.3 Pa |
| 10 sec. gel strength | 14.4 Pa |
| 10 min. gel strength | 44.0 Pa. |
| Measured values after ageing for 20 h at 175° C. in a roller oven: | |
| 600 rpm | 55 scale units |
| 300 rpm | 29 scale units |
| apparent viscosity | 27.5 mPa.s |
| plastic viscosity | 26 mPa.s |
| yield | 1.4 Pa |
| 10 sec. gel strength | 0 Pa |
| 10 min. gel strength | 1.0 Pa. |

A pressure water loss of 8.8 ml was determined with an API filter press.

It can thus be seen that, in the case of CMC the initially very high viscosity, yield and gel strength values were greatly reduced after temperature stressing compared with the drilling mud additive according to the invention based on a polymer mixture, and that the loss of water under pressure is also more than twice as high.

Comparison Example 2

The same drilling mud as in Example 3 was prepared with a comparison polymer mixture and measured in the same way. The comparison polymer mixture corresponded quantitatively to the polymer mixture of Example 1 according to the invention, but by contrast had been prepared by mixing of the solution of the sodium salt of a homopolymer of acrylic acid with dried CMC.

| Mud formulation: | |
|---|---|
| 350 ml | aqueous NaCl solution, saturated |
| 10 g | attapulgite (clay) |
| 12.5 g | mixture of CMC + polyacrylate 1:1 |
| 6 ml | diethanolamine |
| 200 g | barite (barium sulfate). |

Rheological values before aging (Fann viscosimeter):

| | |
|---|---|
| 600 rpm | 104 scale units |
| 300 rpm | 67 scale units |
| apparent viscosity | 52 mPa.s |
| plastic viscosity | 37 mPa.s |
| yield | 14.3 pa |
| 10 sec. gel strength | 1.9 Pa |
| 10 min. gel strength | 5.3 Pa. |
| Measured values after ageing for 20 h at 175° C. in a roller oven: | |
| 600 rpm | 68 scale units |
| 300 rpm | 37 scale units |
| apparent viscosity | 34 mPa.s |
| plastic viscosity | 31 mPa.s |
| yield | 2.9 Pa |
| 10 sec. gel strength | 0.5 Pa |
| 10 min. gel strength | 1.0 Pa. |

A pressure water loss of 6.9 ml was determined with an API filter press.

The above values clearly reflect the considerably better performance properties of the drilling mud additive according to the invention compared with the otherwise identical polymer mixture which had not been prepared in accordance with the invention.

Example 4

To demonstrate the effect of magnesium mixed liquor on the properties of the drilling mud, a corresponding drilling mud was prepared.

| Mud formulation: |
| --- |
| 350 ml magnesium mixed liquor |
| Composition of the Mg mixed liquor: |
| 634 g $MgCl_2 \times 6H_2O$ |
| 128 g KCl |
| 85 g $MgSO_4 \times H_2O$ |
| 120 g NaCl |
| 1 l dist. $H_2O$ |
| 10 g attapulgite |
| 12.5 g polymer mixture of Example 1 |
| 6 ml diethanolamine |
| 200 g barite (barium sulfate). |

The following values were determined with a Fann viscosimeter and an API filter press before and after ageing for 20 h at 175° C. in a roller oven.

|  | Before aging | after 20 h at 175° C. |
| --- | --- | --- |
| 600 rpm | 48 scale units | 28 scale units |
| 300 rpm | 27 scale units | 15 scale units |
| apparent viscosity | 24 mPa.s | 14 mPa.s |
| plastic viscosity | 21 mPa.s | 13 mPa.s |
| yield | 2.9 Pa | 1.0 Pa |
| 10 sec. gel strength | 1.4 Pa | 1.0 Pa |
| 10 min. gel strength | 3.8 Pa | 1.9 Pa |
| Pressure water loss | 21 ml | 29 ml |

We claim:

1. A drilling mud additive consisting essentially of
   A. from about 20 to about 80% by weight of carboxymethylcellulose, and
   B. from about 80 to about 20% by weight of at least one polycarboxylic acid having a number average molecular weight not exceeding 3,000 selected from the group consisting of a homopolymer of acrylic acid, a homopolymer of methacrylic acid, a copolymer of acrylic acid and methacrylic acid, and a water soluble salt of any of the foregoing acids,
   wherein the carboxymethylcellulose, obtained from raw linters or wood cellulose, or both, by the slurry process, is mixed in wet, alcohol-moist form with component B and the resulting mixture is dried to form said drilling mud additive.

2. The drilling mud additive of claim 1 wherein from about 30% to about 70% of component A and about 70 to about 30% of component B is present therein.

3. The drilling mud additive of claim 1 wherein from about 40 to about 60% of component A and from about 60 to about 40% of component B is present therein.

4. The drilling mud additive of claim 1 wherein component B is a homopolymer of acrylic acid or a water soluble salt thereof.

5. The drilling mud additive of claim 1 wherein component B is a homopolymer of methacrylic acid or a water soluble salt thereof.

6. The drilling mud additive of claim 1 wherein component B has a number average molecular weight of from about 1,000 to about 3,000.

7. The drilling mud additive of claim 1 wherein component A has a viscosity in the range of from about 5,000 to about 25,000 mPa.s measured with a Brookfield RVT in a concentration of 5%.

8. The drilling mud additive of claim 7 wherein said viscosity is in the range of from about 10,000 to about 20,000 mPa.s.

9. The drilling mud additive of claim 1 wherein component A has an average degree of substitution of from about 0.9 to about 1.5.

10. The drilling mud additive of claim 9 wherein the average degree of substitution is from about 1.0 to about 1.32.

11. The drilling mud additive of claim 1 wherein component A is present in from about 40% to about 60% by weight, component B is present in from about 60% to about 40% by weight, component B is a homopolymer of acrylic acid or salt thereof having a number average molecular weight of from about 1,000 to about 3,000, and component A has an average degree of substitution of from about 1.0 to about 1.32.

12. A water-based drilling mud containing a high temperature and electrolyte stabilizing quantity of the additive of claim 1.

13. A well-servicing fluid containing a high temperature and electrolyte stabilizing quantity of the additive of claim 1.

14. A casing cement containing a high temperature and electrolyte stabilizing quantity of the additive of claim 1.

15. The drilling mud of claim 12 wherein said quantity is from about 0.5 to about 5% by weight.

16. The well-servicing fluid of claim 13 wherein said quantity is from about 0.5 to about 5% by weight.

17. The casing cement of claim 14 wherein said quantity is from about 0.5 to about 5% by weight.

18. A process for the preparation of a drilling mud additive consisting essentially of
   A. from about 20 to about 80% by weight of carboxymethylcellulose, and
   B. from about 80 to about 20% by weight of at least one polycarboxylic acid having a number average molecular weight not exceeding 3,000 selected from the group consisting of a homopolymer of acrylic acid, a homopolymer of methacrylic acid, a copolymer of acrylic acid and methacrylic acid, and a water soluble salt of any of the foregoing acids,
   wherein the carboxymethylcellulose is obtained from raw linters or wood cellulose, or both, by the slurry process, comprising the steps of:
   I. mixing the carboxymethylcellulose in wet, alcohol-moist form with the at least one polycarboxylic acid or water soluble salt thereof, and
   II. drying the resulting mixture to form said drilling mud additive.

19. The process of claim 18 wherein the drilling mud additive contains from about 30 to about 70% of component A and about 70 to about 30% of component B.

20. The process of claim 18 wherein the drilling mud additive contains from about 40 to about 60% of component A and from about 60 to about 40% of component B.

21. The process of claim 18 wherein component B is a homopolymer of acrylic acid or methacrylic acid or a water soluble salt of the foregoing acids.

22. The process of claim 18 wherein component B has a number average molecular weight of from about 1,000 to about 3,000, and component A has a viscosity in the range of from about 5,000 to about 25,000 mPa.s measured with a Brookfield RVT in a concentration of 5%.

23. The process of claim 22 wherein said viscosity is in the range of from about 10,000 to about 20,000 mPa.s. and wherein component A has an average degree of substitution of from about 0.9 to about 1.5.

* * * * *